US010522992B2

(12) United States Patent
Kuster et al.

(10) Patent No.: US 10,522,992 B2
(45) Date of Patent: Dec. 31, 2019

(54) THERMAL SNOW AND ICE PREVENTION SYSTEM FOR BRIDGE CABLES

(71) Applicant: AEF Ice Systems Inc., Durham, NC (US)

(72) Inventors: Travis M. Kuster, Brooklyn, NY (US); Alexander F. Brown, New York, NY (US)

(73) Assignee: AEF Ice Systems, Inc., Durham, NC (US)

( * ) Notice: Subject to any disclaimer, the term of this patent is extended or adjusted under 35 U.S.C. 154(b) by 0 days.

(21) Appl. No.: 16/420,335

(22) Filed: May 23, 2019

(65) Prior Publication Data

US 2019/0363529 A1 Nov. 28, 2019

Related U.S. Application Data

(60) Provisional application No. 62/676,362, filed on May 25, 2018, provisional application No. 62/676,350, filed on May 25, 2018.

(51) Int. Cl.
*E01D 11/00* (2006.01)
*H02G 7/16* (2006.01)
(Continued)

(52) U.S. Cl.
CPC .............. *H02G 7/16* (2013.01); *E01D 19/16* (2013.01); *E01D 11/04* (2013.01)

(58) Field of Classification Search
CPC ............ E01D 11/04; E01D 19/16; H02G 7/16
(Continued)

(56) References Cited

U.S. PATENT DOCUMENTS

| 6,207,939 B1 | 3/2001 | Allaire et al. |
| 6,682,259 B1 * | 1/2004 | Thomas, Sr. ............. E01D 4/00 14/24 |

(Continued)

FOREIGN PATENT DOCUMENTS

| CA | 2802204 A1 | 7/2014 | |
| CN | 205443974 * | 8/2016 | ............. E01D 19/16 |

(Continued)

OTHER PUBLICATIONS

Kleissl, K et al.; (2010) "Bridge ice accretion and de- and anti-icing systems: A review." In the 7th Internation Cable Supported Bridge Operators' Conference: Proceedings. (pp. 161-167).

(Continued)

*Primary Examiner* — Raymond W Addie
(74) *Attorney, Agent, or Firm* — Blank Rome LLP

(57) ABSTRACT

Ice mitigation for bridge cables is provided by a system having a plurality of heaters on one or more bridge cables, extending parallel to a longitudinal axis thereof, arranged in a plurality of heater sections, and configured to heat an outer surface of the bridge cables, and a control system including one or more controllers configured to individually activate and regulate heating output of the heater sections to prevent snow or ice from falling from the bridge cables. The heater sections can be arranged radially, about a circumference of the bridge cables, and/or axially, end to end along a length of the bridge cables, so that power can be individually directed to the heater sections to account for differing heating requirements at different radial and/or axial aspects of the bridge cables.

20 Claims, 13 Drawing Sheets

(51) Int. Cl.
*E01D 19/16* (2006.01)
*E01D 11/04* (2006.01)

(58) Field of Classification Search
USPC .................................................. 14/18–22, 78
See application file for complete search history.

(56) References Cited

U.S. PATENT DOCUMENTS

| | | | |
|---|---|---|---|
| 6,723,971 | B1 | 4/2004 | Petrenko et al. |
| 6,870,139 | B2 | 3/2005 | Petrenko |
| 7,038,125 | B2 | 5/2006 | Petrenko et al. |
| 7,164,100 | B2 | 1/2007 | Petrenko et al. |
| 8,716,634 | B2 | 5/2014 | Biller |
| 9,006,617 | B2 | 4/2015 | Mullen |
| 9,078,292 | B1 | 7/2015 | Mullen |
| 9,345,067 | B2 | 5/2016 | Biller |
| 9,346,550 | B2 | 5/2016 | Gambino et al. |
| 9,512,580 | B2 | 12/2016 | Duncan et al. |
| 10,113,278 | B1 | 10/2018 | Carney |
| 2009/0114422 | A1 | 5/2009 | Longatti |
| 2016/0138812 | A1 | 5/2016 | Losi |

FOREIGN PATENT DOCUMENTS

| | | | | |
|---|---|---|---|---|
| CN | 105926442 | A | | 9/2016 |
| CN | 205741914 | U | | 11/2016 |
| CN | 108316146 | A | | 7/2018 |
| CN | 208023412 | U | | 10/2018 |
| DE | 10337937 | | * 8/2003 | ............. B60M 1/13 |
| JP | 2006322177 | A | | 11/2006 |
| JP | 200821483 | A | | 1/2008 |
| JP | 2008190194 | A | | 8/2008 |

OTHER PUBLICATIONS

Laursen, Ernst et al.; 2004. The great belt bridge, Denmark: Structural Monitoring. In: the 4th International Cable Supported Bridge Operators' Conference (ICSBOC). pp. 89-98.

Petrenko, Victor.; (2007). Ice adhesion and ice friction modification using pulsed thermal power. Dartmouth College.

Petrenko, Victor et al.; (2011). "Pulse electro-thermal de-icer (PETD)." Cold Regions Science and Technology. 65.70-78.10.1016/j.coldregions. 2010.06.002.

Nims, Douglas et al.; (2014). "Ice prevention or Removal on the Veteran's Glass City Skyway Cables" Final Report. Ohio Department of Transportation Office of Research and Development, State Job No. 134489.

Niims, Douglas et al; (2014). "Ice Prevention or Removal on the Veteran's Glass City Skyway Cables" Executive Summary. Ohio Department of Transportation Office of Research and Development, State Job No. 134489.

Mirto, Clinton J.; "A sensor for ice monitoring on bridge superstructures." (2015) Theses and Dissertations. paper 1855.

Likitkumchorn, Nuhavit: (2014). "Ice prevention and Weather monitoring on cable-stayed bridges", Theses and Dissertations. 1750. M.S. Thesis Paper—University of Toledo.

English translation; China Publication No. CN105926442; Publication Date: Sep. 7, 2016; 7 pages.

English translation; China Publication No. CN205741914; Publication Date: Nov. 30, 2016; 4 pages.

English translation; Japan Publication No. JP2006322177; Publication Date: Nov. 30, 2006; 6 pages.

English translation; Japan Publication No. JP2008021483; Publication Date: Jan. 31, 2008; 5 pages.

Eiche, Michael; "System Failure Case Study—Ice Falling from Port Mann Bridge Cables"; www.engineeringnewworld.com; Dec. 22, 2016; 4 pages.

Meiszner, Peter; Port Main Bridge Dec. 20, 2013; "Ice bomb prevention system"; https://globalnews.ca/news/1044434/port-mann-bridge-ice-bomb-prevention-system-debuts-during-todays-snowy-weather/; 1 page.

International Search Report and Written Opinion dated Sep. 22, 2019; International Application No. PCT/US2019/033658; International Filing Date: May 23, 2019; 8 pages.

English translation; Japanese Published Application No. JP2008190194; Publication Date: Aug. 21, 2008; 9 pages.

English translation; Chinese Published Application No. CN108316146; Publication Date: Jul. 24, 2018; 12 pages.

English translation; Chinese Published Application No. CN208023412; Publication Date: Oct. 30, 2018; 7 pages.

* cited by examiner

THERMAL SNOW AND ICE PREVENTION SYSTEM FOR BRIDGE CABLES

RELATED APPLICATIONS

This application claims benefit of priority of: U.S. Provisional Application No. 62/676,362, filed May 25, 2018; and U.S. Provisional Application No. 62/676,350, filed May 25, 2018. Each of the above-identified related applications are incorporated herein by reference.

FIELD OF THE INVENTION

The present invention relates generally to thermal ice mitigation for bridge cables; and more particularly to a method and system providing anti-icing, de-icing, and/or intermittent de-icing of bridge cables.

BACKGROUND OF THE INVENTION

During winter storms, frozen precipitation can accumulate on cable-stayed bridges as wet snow, atmospheric icing, or freezing rain. During or after a storm the frozen accretion can shed off of the stay and ice can fall into traffic, damaging cars and injuring pedestrians. Several cable-stayed bridges have experienced significant icing problems resulting in injury, damage, and temporary bridge closure. Existing solutions are limited to bridge closure, manual de-icing from a boom lift, and mechanical methods based on sliding a chain down the length of the stay. While the chain method allows the bridge to remain partially open, the sliding chains can wear out the cable stays, reducing their useful life. In addition, the chain method requires a large number of onsite workers to be present during each storm to hoist the chains back to the top of each cable stay. The process of operating the chain system is costly and exposes workers and drivers to additional risk. Several anti-icing coatings have been tested but none have been shown to be effective. Testing has been done on several thermal systems designed to either melt or shed snow and ice buildup. Each system has shown that thermal systems have the potential to effectively prevent dangerous accumulations, however, previous methods have all been deemed too energy intensive to be practical on a large scale.

SUMMARY OF THE INVENTION

The invention is a thermal ice mitigation system for bridge cables including heated cable (or cable stay) sheaths connected to an electrical distribution system that is monitored and operated by a control system. The system can be designed to reduce snow and ice buildup on the cables (or cable stays) by either melting any incoming precipitation on contact (anti-icing) or by melting buildup at some interval (intermittent de-icing). The cables (or cable stays) may be divided into heated sections circumferentially or axially to allow each section to be controlled independently. Each independent section may deliver only the required amount of thermal energy to melt the incoming precipitation (in anti-icing mode), or to melt the buildup on that section (in intermittent de-icing mode). A sectioned heating system takes advantage of the fact that both heat loss to convection and the thermal energy required to melt/prevent snow and ice buildup vary around the circumference of the cable stay. In a sectioned heating system, areas with more buildup (e.g. the top side of the cable) may use more heat than areas with little or no build up (e.g. the underside of the cable).

The control system operates the heaters in such a way that energy use and dangerous snow and ice buildup are minimized. The controller may use temperature sensing to determine if snow is present on each heated section. The controller can also be set to cap the electrical output at a certain level to reduce the total system demand. In the case where total output is capped, the system can distribute power to more problematic areas first. The top segments of each cable present the greatest risk for falling snow and ice since snow and ice falling from these locations has the furthest distance to fall. Under limited power conditions, these areas can be melted first. The system will then move to lower, less problematic areas. The risk of falling snow and ice is a product of the time an accretion is in place and the likelihood that the falling accretion will cause damage. Overall risk can be minimized by targeting (i.e. heating) the highest risk areas first.

In one embodiment, a system for bridge cable ice mitigation includes a plurality of heaters arranged in radial sections about a circumference of, and extending parallel to a longitudinal axis of, one or more bridge cables, the heaters configured to heat an outer surface of the bridge cables. The system also includes a control system including one or more controllers configured to individually activate and regulate heating output of the radial sections to mitigate cable ice, thereby preventing snow or ice from falling from the bridge cables. The embodiment can efficiently account for differing heating requirements of different radial aspects of the bridge cables.

In another embodiment, either alternatively or in addition, the heaters could further be arranged in axial sections, with the axial sections arranged longitudinally, end to end along a length of the bridge cables, and extending parallel to the longitudinal axis of the bridge cables. The one or more controllers are configured, here, to activate and regulate heating output of the axial sections individually, so that different elevations of a bridge cable span, relative to ground, can receive a different heat output.

In one aspect, the heaters of the radial and/or axial sections can include multiple wire heating elements, generally extending parallel to the longitudinal axis of the bridge cables, and possibly secured on a substrate to maintain spacing therebetween.

In another aspect, the heaters can be applied to an outside of an existing cable sheath of an existing bridge cable. Here, the heaters can be covered by a wrapped layer, the wrapped layer protecting the heaters, or holding the heaters in place. In this aspect, the wrapped layer becomes the outer surface of the bridge cables. In still another aspect, the heaters can be embedded in an outer shell of a cable sheath assembly.

In another embodiment, a system that controls bridge cable de-icing is provided, and includes a plurality of heaters on one or more bridge cables, extending parallel to a longitudinal axis thereof, arranged in a plurality of heater sections, and configured to heat an outer surface of the bridge cables. The system also includes a control system including one or more controllers configured to receive and use precipitation event information directed to event intensity and event direction; and algorithmically and individually determine an amount of, and direct, power to the heater sections to limit total system heating power output. Here, the total system heating power output can be maintained below a predetermined total power capacity limit or can be operated at an algorithmically determined power output level factoring event intensity and a predetermined efficiency factor. The one or more controllers could further be configured to determine an amount of, and direct, power to the individual heater sections based upon de-icing requirements of each section.

In an alternative embodiment, a method for controlling bridge cable de-icing is provided, the method comprising the steps of receiving and using/analyzing, by one or more controllers, precipitation event information directed to event intensity and event direction; and algorithmically and individually determining, by one or more controllers, an amount of, and directing, power to each of a plurality of heater sections, on one or more bridge cables, to limit total system heating power output. Again, the total system heating power output can be maintained below a predetermined total power capacity limit or can be operated at an algorithmically determined power output level factoring event intensity and a predetermined efficiency factor.

In one aspect, the plurality of heater sections can be arranged radially about a circumference of the bridge cables. Power can be individually directed to the heater sections, varying radially, to account for differing heating requirements on different radial aspects of the bridge cables. In another aspect, either alternatively or in addition, the heater sections are arranged axially, end to end along a length of the bridge cables, so that power can be individually directed to the heater sections, varying axially, to account for differing heating requirements at different axial aspects of the bridge cables.

In still another aspect, whether in the system or the method, the one or more controllers can additionally use weather data to calculate event intensity and event direction; to individually adjust power directed to each heater section; and to determine a sectioning order that increases heating power to specific heater sections in areas expected to experience increased accumulation and that decreases heating power to specific heater sections in areas not expected to experience accumulation.

In a further aspect, whether in the system or the method, power output and temperature of individual heater sections can be monitored and used to determine heat loss, caused by the precipitation event, at respective individual heater sections. The one or more controllers can individually adjust power directed to each heater section according to the event intensity and the event direction. Further, heating response information of an individual heater section might be used to determine if frozen precipitation is impacting, or has accumulated on, the individual heater section. The one or more controllers can further use the heating response information from one area or bridge cable to inform a control of another area or bridge cable.

In another aspect, whether in the system or the method, the one or more controllers can activate individual heater sections in an order determined to prioritize a reduction of risk of falling frozen precipitation, in areas characterized as higher risk, from bridge cable sections associated with the individual heater sections. Further, the one or more controllers can direct power to an individual heater section after a certain amount of frozen precipitation has accumulated on a bridge cable section associated with the individual heater section, such that the certain amount of frozen precipitation is removed. The one or more controllers can further direct power to the individual heater section to induce accumulation release at an interval determined, by the one or more controller, to keep frozen accumulation, at the respective location, below a preselected level. Still further, the one or more controllers can direct power to an individual heater section to maintain a surface temperature of an associated bridge cable section, at the individual heater section location, at or above a level sufficient to melt any incoming frozen precipitation such that no frozen accumulation occurs on the associated bridge cable section.

In still another embodiment, a system that limits instances of falling snow and ice from a bridge cable is provided, and involves a system including a plurality of heaters on one or more bridge cables, extending parallel to a longitudinal axis thereof, arranged in a plurality of heater sections, and configured to heat an outer surface of the bridge cables. The system also includes a control system including one or more controllers configured to use precipitation event information to algorithmically determine a prioritization schedule to individually direct power to the heater sections.

In an alternative to this still another embodiment, a method of limiting instances of falling snow and ice from a bridge cable is provided, the method comprising the steps of receiving and using/analyzing, by one or more controllers, precipitation event information; algorithmically determining, by the one or more controllers, a prioritization schedule to individually direct power to each of a plurality of heater sections, on one or more bridge cables.

Whether in the system or the method, in this still another embodiment, the prioritization schedule can include that a portion of the heater sections operate in an anti-icing mode, where a surface temperature of an associated bridge cable section, at the individual heater section location, is held at or above a level sufficient to melt any incoming frozen precipitation such that no frozen accumulation occurs on the associated bridge cable section; and/or that another portion of the individual heater sections operate in a de-icing mode, where a bridge cable section is heated after a certain amount of frozen precipitation has accumulated on the bridge cable section, such that a melt layer is formed and the certain amount of frozen precipitation releases from the bridge cable section, and where an interval is determined, for intermittent heating in the de-icing mode, to induce accumulation release before frozen accumulation reaches a preselected level.

Whether in the system or the method, in this still another embodiment, the one or more controllers effectively prevent dangerous accumulations of frozen precipitation while operating under a preselected total power constraint such that power is individually directed to the heater sections to prioritize a reduction of risk of falling frozen precipitation, in areas characterized as higher risk, by addressing each bridge cable section associated with each heater section. In one aspect, a determination might dictate that a portion of the individual heater sections do not operate. In this still another embodiment, and in all the embodiments, the heater sections may be arranged radially and/or axially, as detailed above.

In a further embodiment, the present invention provides just control circuitry for controllers, or just a computer-readable medium (CRM) with instructions, and/or various other necessary components, directed to controlling operation of a cable heating system (e.g., where sectioned heaters might already exist in a bridge cable setting). For example, the control circuitry may include, and/or the present invention may alternatively involve, just a processor and/or a computer-readable medium (CRM) capable of executing program instructions to perform any of the methodology, system functionality and/or algorithms described above, or as further detailed below.

In addition, where embodiments and/or aspects of the present invention are summarized above, or are further detailed below, in a system or apparatus environment (e.g., apparatus claims), it is understood that the invention equally includes the components and/or functionality articulated therein in a method environment (e.g., method claims), and vice versa.

BRIEF DESCRIPTION OF THE ILLUSTRATED EMBODIMENTS

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown:

DETAILED DESCRIPTION OF THE ILLUSTRATED EMBODIMENTS

It is to be understood that the figures and descriptions herein may have been simplified to illustrate elements that are relevant for a clear understanding of the present invention, while eliminating, for purposes of clarity, other elements that might be included in heating systems, control systems, and electrical distribution systems surrounding bridges and bridge cable systems. Those of ordinary skill in the art will recognize that other elements may be desirable, preferable and/or required to implement the present invention. However, because such elements are well known in the art, and because they do not facilitate a better understanding of the present invention, a discussion of such elements may not be provided herein. It is also to be understood that the drawings included herewith only provide diagrammatic representations of the presently preferred structures of the present invention and that structures falling within the scope of the present invention may include structures different than those shown.

For purposes of this disclosure, the terms "bridge cable (s)," "cable stay," "suspension cable(s)," and "cable(s)" may all be used interchangeably, as the present invention is equally applicable to any bridge cable system. Further, the present invention is not limited to bridges, but to any cable system capable of benefitting from thermal ice mitigation.

Figure 1:
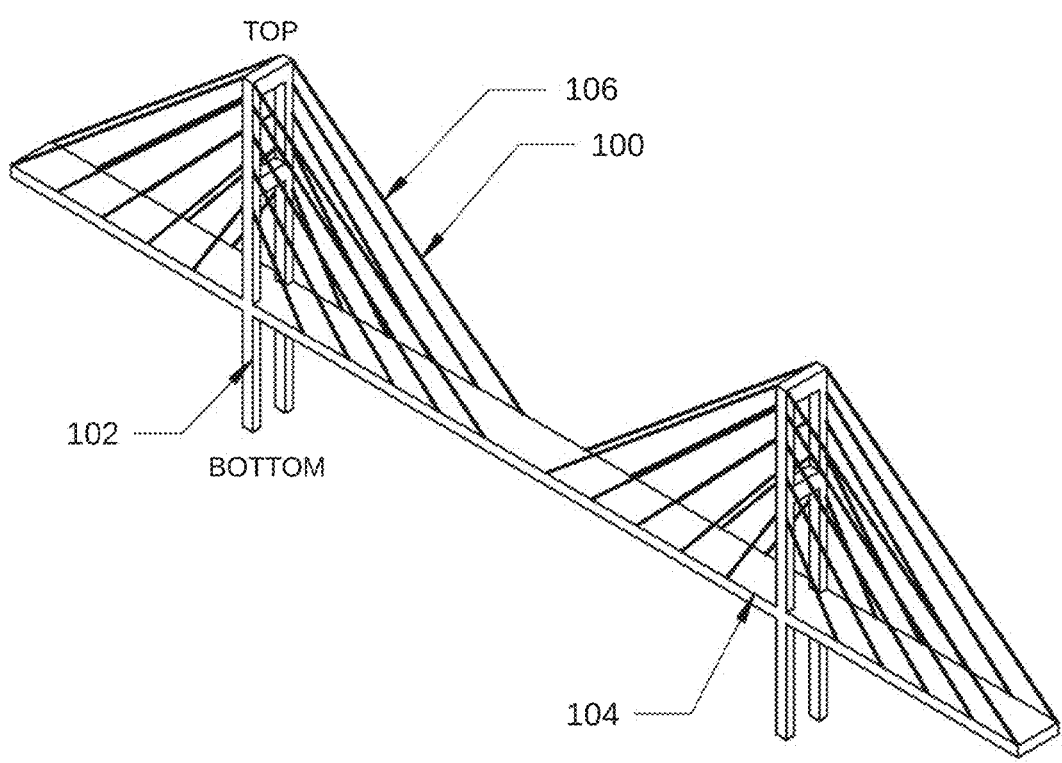
FIG. 1 illustrates an example of a cable stayed bridge containing a heating system.

Referring now to the drawings, wherein like numerals indicate like elements, there is shown in FIG. 1 a cable stayed bridge containing a heating system 106.

FIG. 1—Bridge Diagram

FIG. 1 illustrates an example of a cable stayed bridge containing a heating system 106. The top of each cable stay 100 is attached to a pylon 102 while the bottom of each cable stay 100 is attached to a bridge deck 104. Each cable stay 100 may contain a heating system 106 that extends from the top of the cable stay to the bottom or some location in between.

Control systems, sensors, and elements of an electrical distribution system may be housed in/on the pylon(s) 102 and/or the bridge deck 104.

The pylon 102 may contain a heating system to prevent dangerous snow/ice accretion on the surface of the pylon. Similarly, the bridge deck 104 may contain a heating system to melt snow/ice on the road surface.

Figure 2:
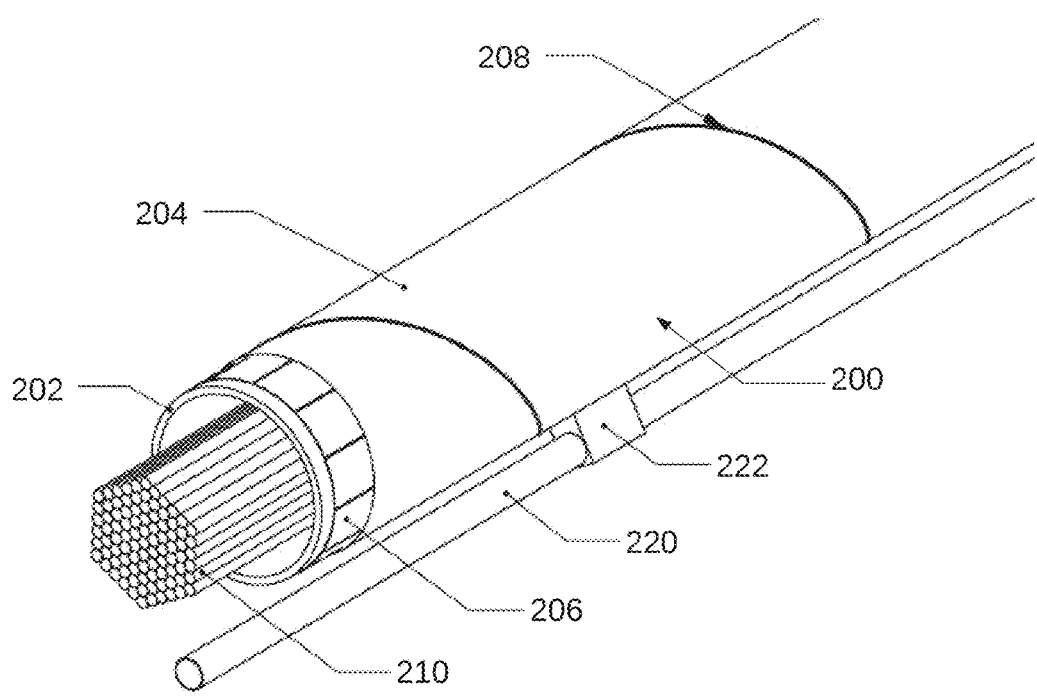
FIG. 2 illustrates a section view of an exemplary heated cable sheath.

FIG. 2—Heated Cable Sheath

FIG. 2 shows a section view of a cable stay 100 where a heated cable sheath 200 covers the cables 210. The heated cable sheath 200 can include an inner layer 202, a layer containing heaters 206, an outer layer 204, and a rivulet 208. Cables 210 run inside of the cable sheath 200 and structurally connect the bridge deck 104 to the pylon(s) 102. An electrical conduit 220 and junction box(es) 222 may be attached to the cable sheath 200.

The inner layer 202 and outer layer 204 of cable sheath 200 may consist of a polymer, a plastic (e.g. High-Density Polyethylene (HDPE), Polyethylene (PE), etc.), a metal (e.g. stainless steel, aluminum, etc.), a composite of multiple materials (e.g. fiber reinforced plastics, laminates, etc.), a coating (epoxy, paint, etc.), or other suitable material(s). Additionally, the inner layer 202 and outer layer 204 may themselves be assemblies of multiple components or layers held together by adhesives, fasteners, or mechanical means, or held in position through contact/alignment with other components.

One or more heaters 206 may be embedded between the inner layer 202 and outer layer 204 and/or may be embedded in or affixed to the inner layer 202 or outer layer 204. In embodiments of a cable sheath 200 where the inner layer 202 and outer layer 204 are separate components, the heater(s) may be held in place by adhesives, vulcanization, fasteners, mechanical means, friction, or some combination thereof.

One or more heaters 206 may be located such that heat is distributed evenly or unevenly around the exterior face of the cable sheath 200 either circumferentially, axially, or both. The heating layer may be divided into multiple sections (circumferential) and/or segments (axial) consisting of one or more heaters 206. Different sections/segments may be controlled separately (i.e. connected to different electrical circuits) or together to efficiently institute control methods described herein. Heaters 206 may be electrically connected to form groups (sections, segments, etc.) using means described herein.

For example, the heaters 206 may be arranged in 4 sections, such that the top, bottom, and both sides of the cable sheath 200 may be controlled individually. As another example, the heaters 206 may be arranged in 12 sections (as shown in FIG. 2) to improve the granularity of control, increasing efficiency and sensing capabilities, as described herein. As another example, the heaters 206 within a physical segment 300 of cable sheath 200 may be grouped into 3 axial segments such that heat delivery may be independently controlled at different elevations within the segment 300 (as further described in FIGS. 3A and 3B). Introducing more sectioning and/or segmentation can, to a point, improve system efficiency/effectiveness; the upper limit on number of sections/segments is dependent on the width of each heater or heating element. Certain sections or segments of the cable sheath 200 may be void of heaters 206, depending on factors such as, for example, design of the overall system, power supply, and expected environmental conditions.

A heater 206 may be comprised of one or more heaters or heating elements connected in parallel or in series. Individual heating elements may be comprised of a heating element and a substrate. A resistive heating element may be comprised of metal or an alloy thereof (e.g. Copper, Nichrome, Steel, etc.), graphite, a semi-conductor, a conductive ink, indium tin oxide (ITO), or another resistive material. A material may be used that has a positive or negative coefficient of resistance (TCR). The substrate may consist of one or more materials, including silicone, polyimide, polyester, polyvinyl fluoride, Tedlar®, fiberglass, ceramic, glass, or other suitable dielectric material. The heating element may be embedded within the substrate, placed on the substrate, and/or sandwiched between two or more layers of the substrate material, which may be held together by an adhesive, vulcanization, mechanical means, or other means. Heating elements may be applied and/or organized using thin film, thick film, wire-wound, etching, cutting, or other techniques. Shape, size, material, pattern, and construction of the heating element(s) may be varied to achieve desired heating characteristics.

For example, a heater 206 may be a wire-wound heater comprised of Nichrome heating elements vulcanized between two layers of silicone. As another example, a heater 206 may be resistance wire, insulated by polyimide film and fiberglass and containing a grounding braid, and embedded between inner layer 202 and outer layer 204 or cable sheath 200. As another example, a heater 206 may consist of uninsulated resistance wire embedded directly within outer layer 204 of cable sheath 200.

The rivulet 208 is a raised ridge on the outside of cable sheath 200 that runs the length of cable stay 100 and improves the aerodynamic characteristics of the cable stay.

An electrical conduit 220 may be attached to the outside of cable sheath 200, may be run inside of the heated cable sheath 200, or may be integrated into or between any component(s) or layers of the heated cable sheath 200. The electrical conduit 220 may house the electrical connections between the heater(s) 206 and/or the electrical distribution system.

An electrical conduit 220 may include one or more junction boxes 222 to allow access to electrical components and facilitate the making of electrical connections. A junction box 222 may be embedded within or integrated into the cable sheath 200.

The heated cable sheath system 200 of FIG. 2 may further include an internal sheath that runs in between the cables 210 and the inner layer 202 of cable sheath 200. This additional sheath may be, for example, an existing cable sheath, a cable sheath designed for the later addition of a heated sheath 200, or a layer to ensure a continuous moisture barrier.

The heated cable sheath system 200 of FIG. 2 may further include various spacers, alignment features (rings, pins, mats, etc.), temporary structures, insulation, etc. Similarly, sensors, electrical components, and/or components of the electrical distribution system may be incorporated into or embedded within the structure of the heated sheath system 200. Any additional sheath or component may be considered/termed a component of heated cable sheath 200.

Figure 3A:
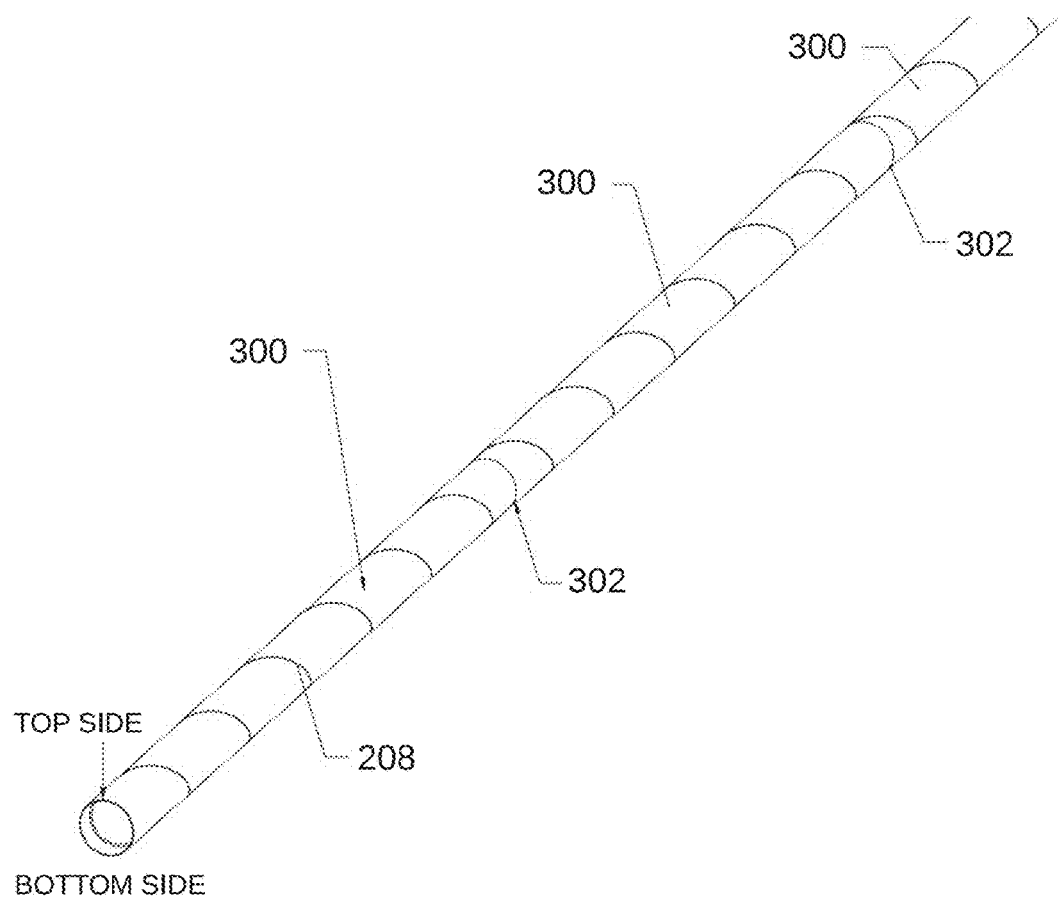
FIG. 3A illustrates an exemplary arrangement of several segments of a cable sheath.

FIG. 3A—Cable Sheath Segmentation

FIG. 3A illustrates a length of a cable stay 100 where the heated sheath system 200 is divided axially into several segments 300. Adjacent segments 300 are connected at a seam 302. This connection can be made by welding, plastic welding, fasteners, adhesives, vulcanization, mechanical means (e.g. interlocking members), or other means, depending on the construction of the segments 300. Connection sleeves may be used to facilitate the connection between adjacent segments 300. These sleeves may attach to the cable stay segments 300 by the means outlined above.

Different segments 300 may contain different heaters 206 or groups of heaters 206, different heater layout/spacing, and/or heaters 206 of different construction or power. Additionally, different segments may contain different constructions and different numbers and/or types of layers/components. Some segments 300 may not contain any heaters 206. For example, low segments 300 (i.e. close to the bridge deck 104) may be at low risk for accretion or release of snow/ice and may not require heating. Different segments 300 may be controlled differently to improve efficiency/effectiveness.

Cable sheaths 200 are generally broken into segments 300 such that they may be packaged on a truck and shipped to a construction site where they are bonded/attached. Components of heated cable sheath 200 may be segmented or, in some cases, may be the full length of a cable stay 100. Individual components of a heated cable sheath 200 (including unheated sheaths, i.e. stay sheath 410) may be of different lengths. For example, in embodiments where inner layer 202 and outer layer 204 are separate components, inner layer 202 may be twice the length of outer sheath 204.

Individual components of a heated cable sheath 200 may be constructed and/or attached on site, in a factory or manufacturing facility, or some combination thereof. Similarly, segments of a cable sheath 200 (or part thereof) may be connected/attached on site or in a factory or manufacturing facility.

Figure 3B:
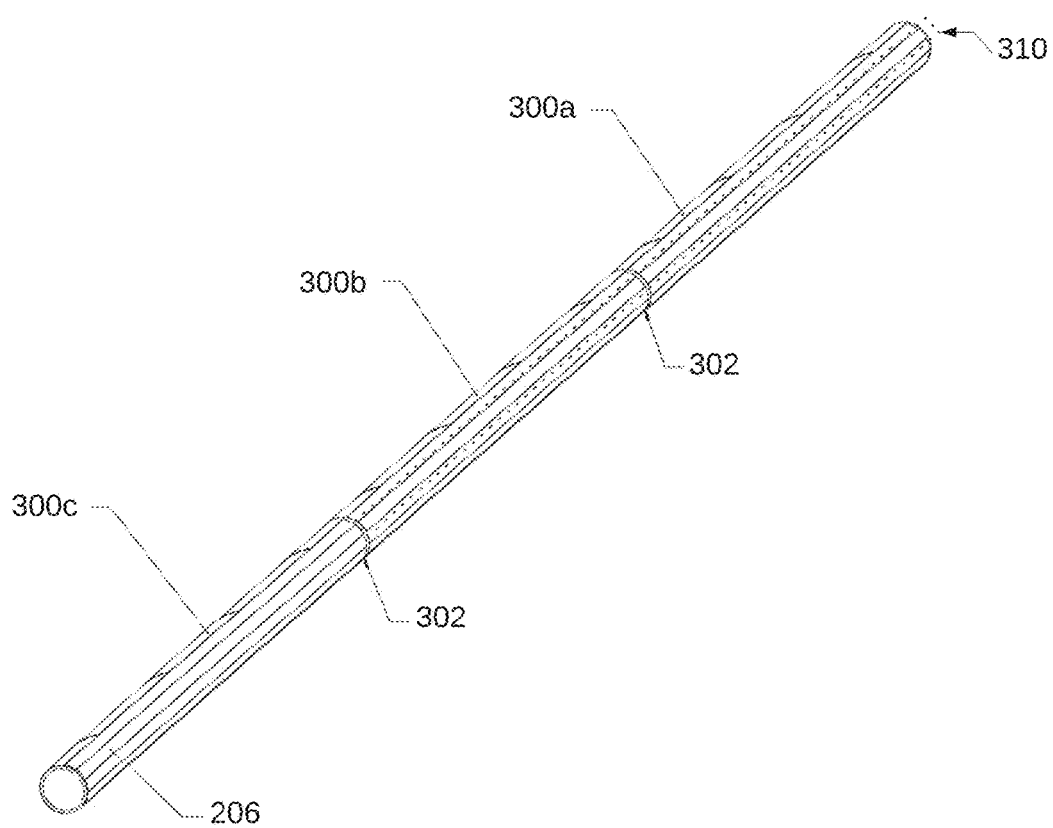
FIG. 3B illustrates an exemplary arrangement of several segments of a cable sheath and the connection of heaters to form heating circuits.

FIG. 3B—Cable Sheath Segmentation—Cutaway

FIG. 3B illustrates a section view of a length of the cable stay 100 of FIG. 3A where the outer layer 204 of each segment 300 is cut away such that the heaters 206 are visible. The heaters 206 are arranged in sections around the circumference of the cable sheath. The blocks constituting a heater 206 can represent a group of heaters electrically connected using means described herein.

A heating circuit 310 may be formed by electrically connecting heaters 206 from separate segments 300 of cable sheath 200. For example, as shown, a heater 206 spanning the full length of segment 300a is electrically connected to a heater 206 spanning the full length of segment 300b to form heating circuit 310. This heating circuit 310 may further include a heater 206 spanning the full length of segment 300c. Generally, a heating circuit 310 may include multiple heaters 206 or group of heaters 206 within one or more segments 300 of cable sheath 200. Different heating circuits 310 may contain different numbers of heaters from different numbers of segments 300. A heating circuit 310 may, in some cases, contain only one heater 206 or group of heaters 206.

Heaters 206 on different segments 300, but within the same heating circuit 310, will generally have the same orientation around the circumference of the cable sheath 200.

Figure 7:
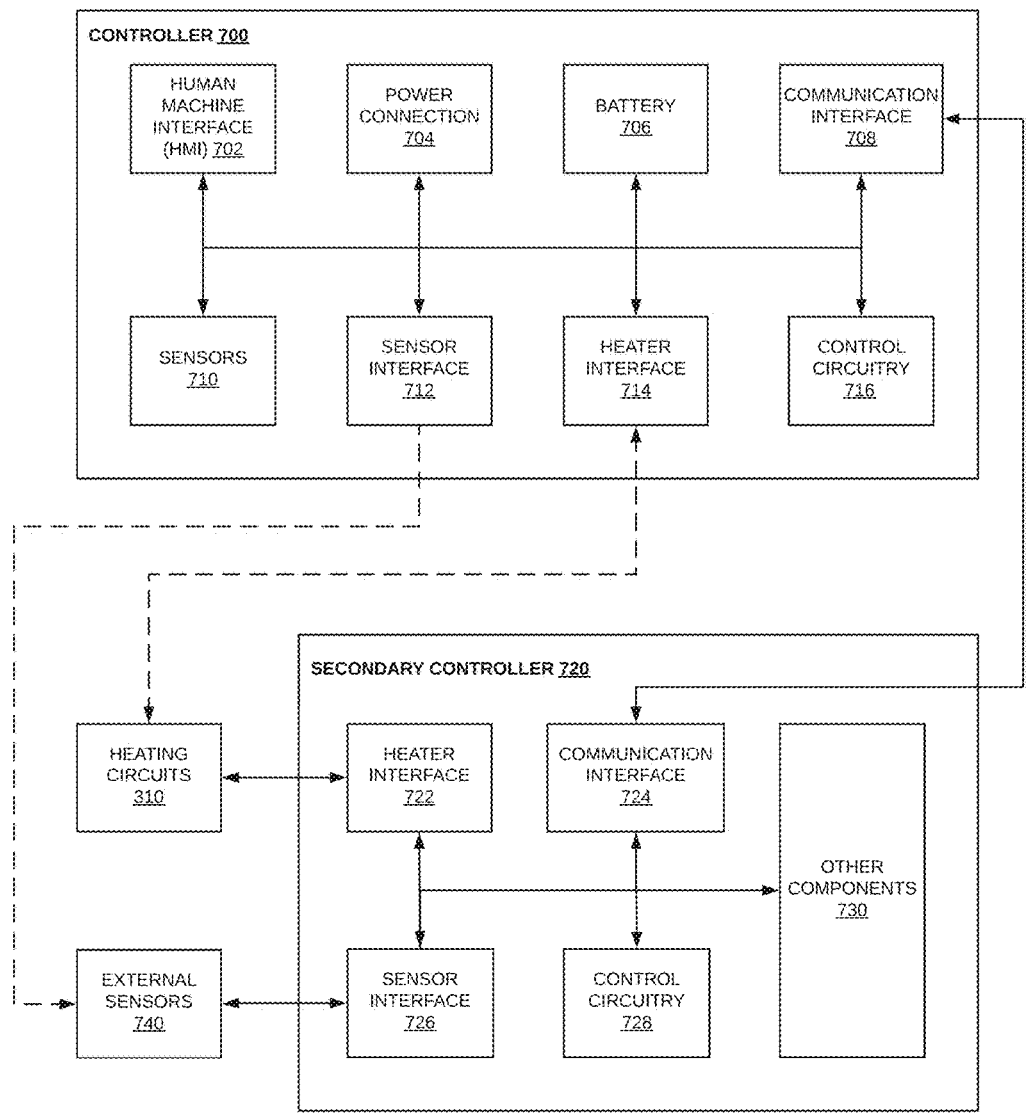
FIG. 7 illustrates an example of an intelligent, network-connected controller system consisting of a primary and secondary controller.

A heating circuit 310 constitutes the smallest area that may be independently controlled by the control system of FIG. 7. In general, each heating circuit 310 will be connected to a single switch or contact that controls the supply of electrical power.

Figure 3C:
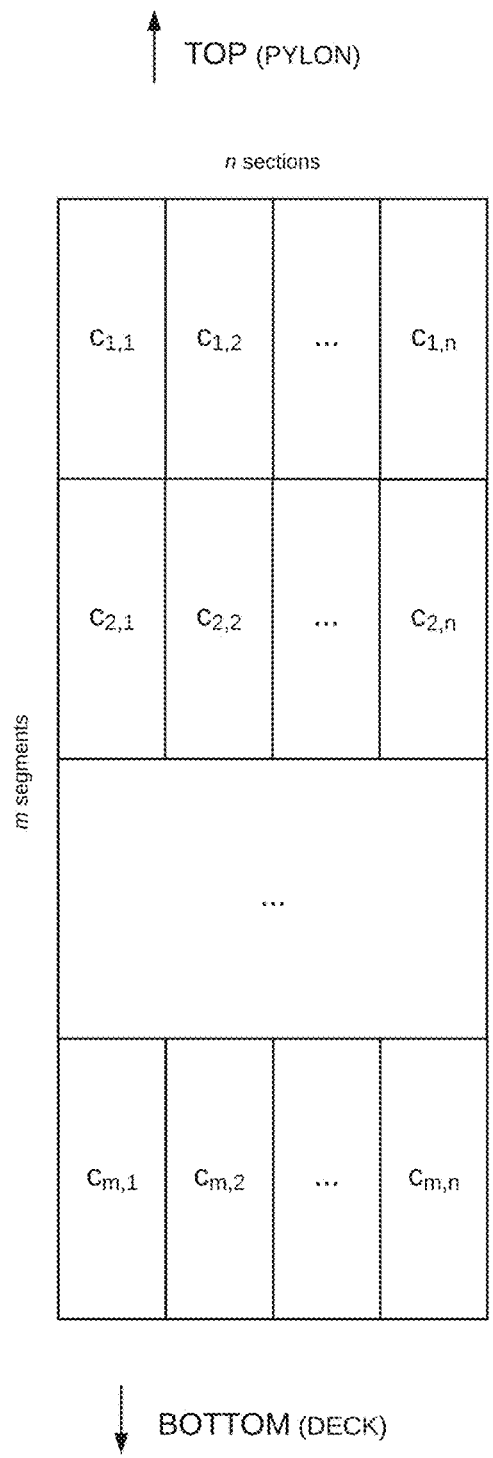
FIG. 3C illustrates an example of the arrangement of heating circuits along a cable stay.

FIG. 3C—Heating Circuit Arrangement

FIG. 3C illustrates a possible arrangement of heating circuits 310 along a cable stay 100. The heating circuits 310 are arranged in n sections that span the cable stay radially and m segments that span the length of the cable stay 100. This figure illustrates how heating circuits may be viewed as separate (especially when discussing control methods) from the physical segments 300 or components of a heated cable sheath 200.

Segment 1 is the uppermost segment (i.e. closest to the pylon) and section m is the lowermost segment (i.e. closest to the bridge deck). The n sections wrap around the circumference of the cable stay 100 such that section 1 is adjacent to section n.

Electrical connections between heaters 206, groups of heaters 206, heating circuits 310 and/or the electrical distribution system may be made using, e.g., wire leads, conductive sleeves, wiring harnesses, plugs, direct connection/contact, or some combination thereof. For example, heaters 206 in adjacent segments 300 may be connected together in series by a set of leads, where the leads may contain one or more connectors or plugs, thus forming a heating circuit 310 or part thereof. These connections may occur inside of or within cable sheath 200, within a system of electrical conduits 220 and junction boxes 222, or within a connection sleeve.

As another example, one or more bus wires may run within conduit 220 that carry power from the electrical distribution system. Heaters 206 within each segment 300 can be connected to the bus wire (e.g. by wire, direct tap, plug, etc.) such that the heaters 206 are connected in parallel. Additionally, a wiring harness may run within conduit 220 that allows for heaters 206 to be connected in parallel or in series or some combination thereof.

As another example, each heater is individually connected to the electrical distribution system by a wire or lead that passes through the electrical conduit 220 and connects directly to a junction box or controller.

As another example, the heaters 206 are connected to the electrical distribution system at the pylon 102 and/or bridge deck 104 and extend all/part way along the cable stay 100. These heaters 206 may be jumped/connected together at one or both ends.

Figure 4:
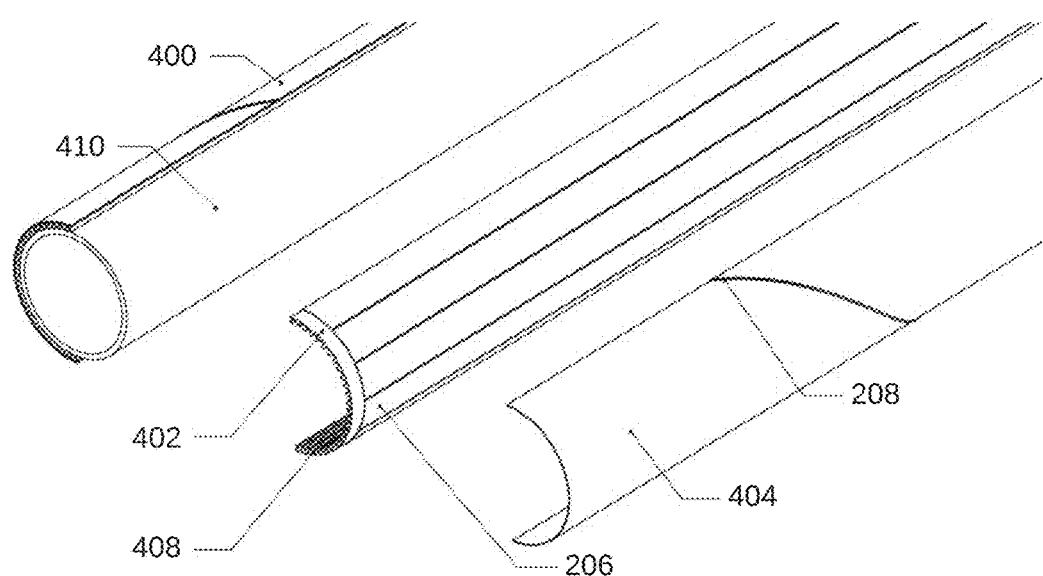
FIG. 4 illustrates an example of a heated half-sheath system.

FIG. 4—Heated Half-Sheath

FIG. 4 shows an exploded view of a heated cable sheath assembly including a stay sheath 410 and two heated half-sheaths 400. A heated half-sheath 400 can consist of an outer half-sheath 404 and an inner half-sheath 402, with heaters 206 embedded in between the two half-sheaths.

The inner half-sheath 402 can include wiring channels 408 to allow electrical connections to be made between heaters 206, groups of heaters 206, heating circuits 310 and/or the electrical distribution system, as discussed herein. A wiring channel 408 may consist of one or more grooves, channels, or tubes that allow wires to sit between a stay sheath 410 and the heated half-sheath 400 without interfering with the fit between components. A wiring channel 408 may be of sufficient volume to house electrical conduit. The inner half-sheath 402 may alternatively not contain any wiring channels 408, in which case electrical wiring and connections may be made elsewhere, as described herein.

The stay sheath 410 may be, for example, an existing cable sheath, a cable sheath designed for the later addition of heated half-sheaths 400 (or any heated sheath(s) 200), or a layer to ensure a continuous moisture barrier. Heated half-sheaths 400 may be removed and/or replaced for maintenance, repair, improvements, etc.

The heated half sheath 400 may be attached to a stay sheath 410 by any means described herein. Any/all of the outer half-sheath 404, inner half-half sheath 402, stay sheath 410, and heaters 206 may contain alignment/registration features (e.g. notches, grooves, tabs, pins. etc.) to ensure correct alignment and fit between the various components.

Seam or gaps between multiple heated half-sheaths 400 and/or other components may be sealed by heat welding, sealant, adhesive, tape, or other suitable means.

FIG. 5—Inner Sheath Embodiments

Figure 5A:
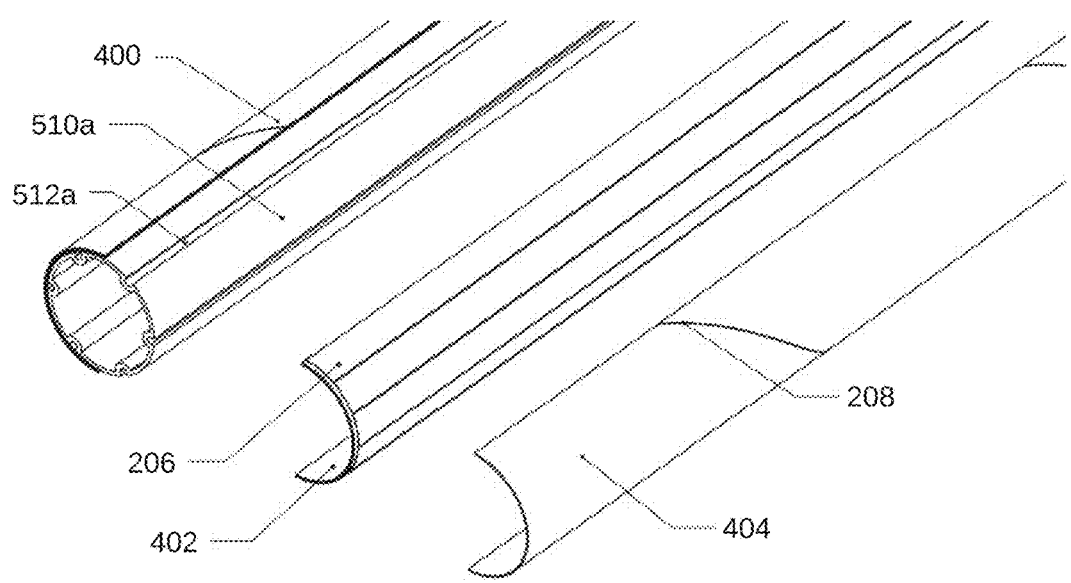
FIG. 5A illustrates an example of a heated cable sheath system where the inner stay sheath contains open wiring channels.

FIG. 5A shows an exploded view of a heated stay assembly including an inner stay sheath 510a with open wiring channels 512a, and two heated half-sheaths 400. The heated half-sheaths 400 may be replaced by any heated sheath 200 or other sheath described herein.

Figure 5B:
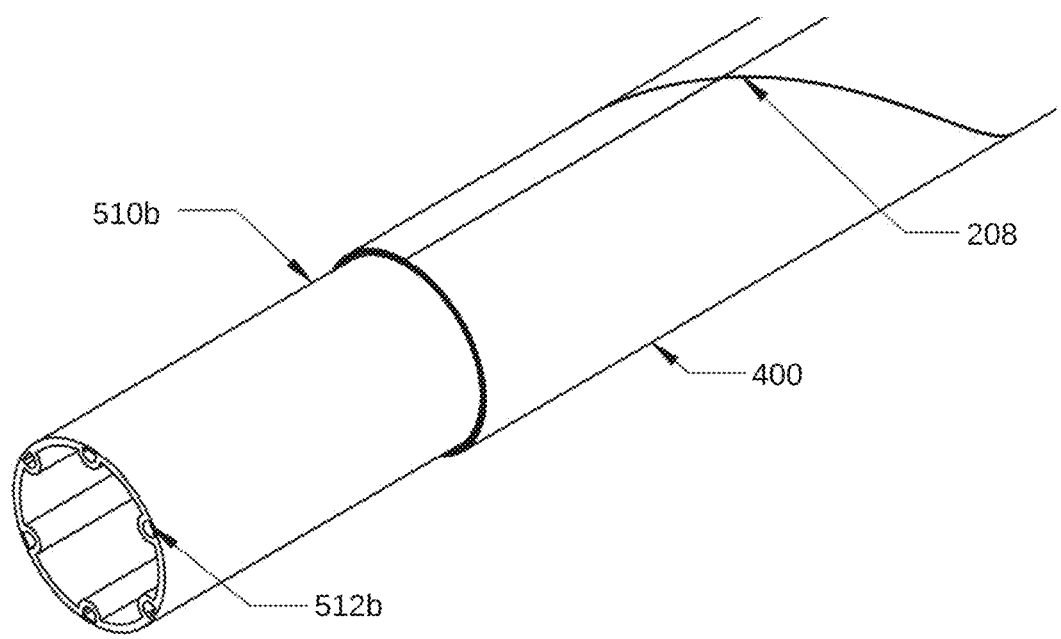
FIG. 5B illustrates an example of a heated cable sheath system where the inner stay sheath contains closed wiring channels.

FIG. 5B shows a section view of a heated stay assembly including an inner stay sheath 510b with closed wiring channels 512b and two heated half-sheaths 400. The heated half-sheaths 400 may be replaced by any heated sheath 200 or other sheath described herein.

Access points (e.g. holes, access ports, connectors, etc.) to the interior space of wiring channels 512b may be incorporated into the exterior surface of cable sheath 510b during or after manufacturing. These access points shall not penetrate the inner surface of cable sheath 510b such that an unbroken moisture barrier is maintained.

The inner stay sheath 510a, 510b can contain one or multiple wiring channels 512a, 512b. The wiring channels 510a, 510b can provide space for electrical connections and wiring between heaters 206 and other heaters 206 and/or an electrical distribution system. Additional electrical conduit may be inserted into the wiring channels 512.

The wiring channels 512a, 512b will generally run the length of a segment of cable sheath 300. When multiple segments 300 of stay sheath 510a, 510b are connected (by means described herein) they will be aligned such that the wiring channels 512a, 512b of one segment align with the wiring channels of the adjacent segment(s). Removeable alignment aids (e.g. pins, jigs, etc.) may be used to ensure alignment during the bonding process and prevent collapse of the wiring channels 512a, 512b.

The wiring channels 512a, 512b can be integrated into/within the structure of the cable sheath 510a, 510b. For example, if cable sheath 510a, 510b is constructed by extruding HDPE, the wiring channels 512a, 512b may be extruded/coextruded into the form of the cable sheath 510a, 510b.

FIG. 6—Wire Heating Elements

Figure 6A:
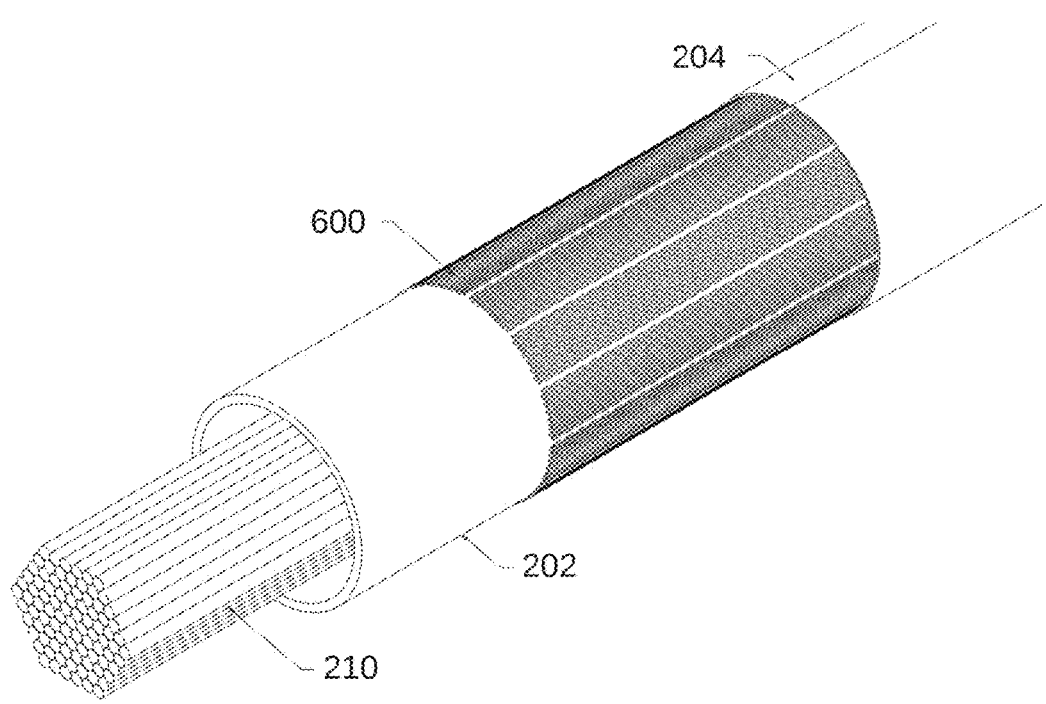
FIGS. 6A-6B illustrate examples of a heated cable sheath system where the heating elements consist of resistance wire.

FIG. 6A shows an embodiment of a heated cable sheath 200 with resistance wire heating elements 600. The inner sheath 202 may be the original inner sheath of an existing bridge or a new inner sheath designed to accept the wire heating elements 600. The wire heating elements 600 may be covered by an outer sheath 204 comprised of one or more sections and/or segments. The inner sheath 202 and/or outer sheath 204 may contain wiring channels as described herein.

Figure 6B:
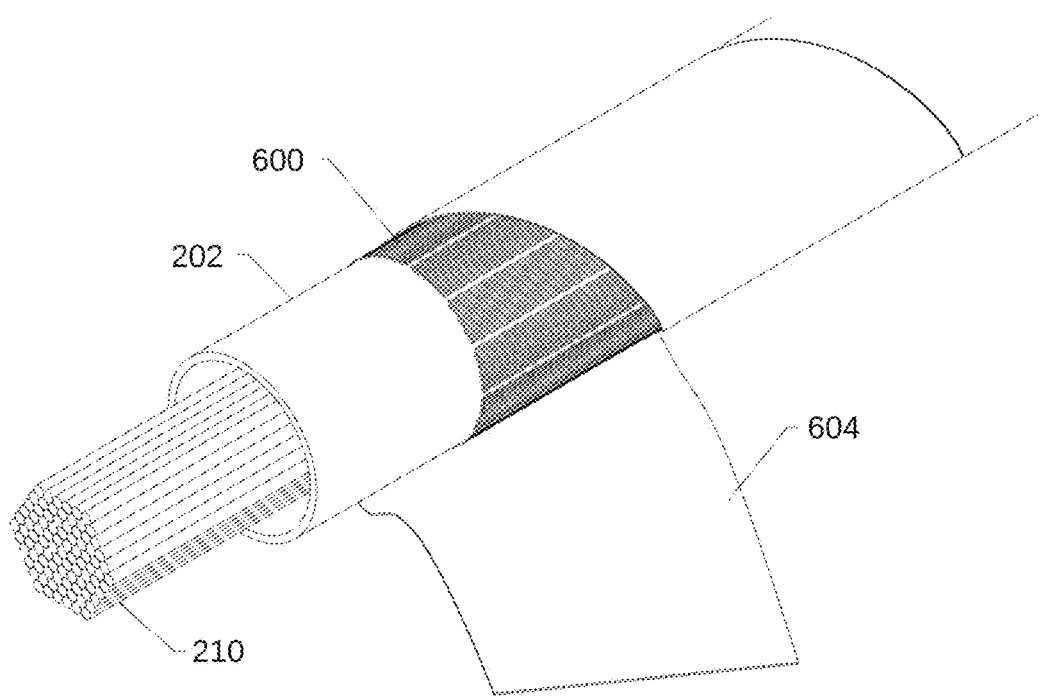

FIG. 6B shows an embodiment of the heated cable sheath 200 with resistance wire heating elements 600 where the outer layer 204 is a wrap 604. The inner sheath 202 may contain wiring channels as described herein. The wrap 604 may be continuous down the length of the cable or extend only over the heated portion(s) of the cable stay. A wrap 604 may serve as an outer layer 204 or may be an additional layer for the purpose of, e.g., waterproofing, IR protection, etc. The cable wrap 604 may be the Cableguard™ Elastomeric Cable Wrap System provided by D.S. BROWN or a similar product. The wrap layer 604 and/or heating elements 600 can be applied/installed in the factory, at job site (before or after the cable stay is installed), or some combination thereof.

The cable sheath systems of FIG. 6A and FIG. 6B may additionally include wiring channels, conduit, junction boxes, spacers, insulation, alignment aids, or other components described herein.

The heating elements 600 shown may be separate wires or multiple passes of one or more wires. The wires may run the entire length or part of the length of a cable stay 100 and/or may additionally double back one or more times. For example, a heating element 600 may start at the top of a cable stay 100, extend to the bottom of the cable stay 100, then double back to the top of the cable stay such that both ends of the heating element 600 are accessible at the top of the cable stay. As another example, heating elements 600 may extend from the top of a cable stay 100 to a location partway or all the way down the cable stay 100. Adjacent heating elements 600 may be jumped together (i.e. electrically connected) at the lower end such that a series resistor is created with both poles at one end (i.e. the top) of the cable stay 100. Such methods can simplify electrical wiring (e.g. between heaters 600 and the electrical distribution system and/or controllers) and may reduce costs.

Heating elements 600 of different construction (i.e. resistance, material, diameter, etc.) and/or different spacing between heating elements 600 may be used within a cable sheath 200 to change the amount of heat directed to different segments or sections. Similarly, different constructions and spacing may be used on different cable stays 100 when different heating characteristics are required between cable stays 100.

The heating elements 600 may alternatively be constant-wattage or self-regulating heating cable with two bus wires, such that both poles can be accessed at either end of the heating element 600.

FIG. 7—Control System

FIG. 7 illustrates an embodiment of an intelligent, network-connected control system where a primary controller 700 is connected to a (optional) secondary controller 720. The control system of FIG. 7 may be used to operate the heating system 106 by modulating power to the heating circuits 310. Each controller 700 within a system of controllers can include a human-machine interface 702, a power supply (e.g. including a power connection 704 and/or a battery 706), a communication interface 708, one or more sensors 710, a sensor interface 712, a heating interface 714, and control circuitry 716. External sensors 740 may be connected to the controller via the sensor interface 712. Heating circuits 310 may be connected to the heater interface 714.

HMI—One or more human-machine interface components 702 in controller 700 may be configured to present information to a user via a visual display (e.g. an LED display) and/or an audio speaker. Human-machine interface components 702 may also include one or more user-input components to receive information from a user, such as a touchscreen, button, scroll wheel, switch, microphone, camera or another component. Additionally, a user may interface with the controller 700 via a device that is temporarily or permanently connected, either wired or wirelessly, to the controller via the communication interface 708 or the sensor interface 712.

Power Supply—A power supply component in controller 700 may include a power connection 704 and/or battery 706. For example, power connection 704 can connect controller 700 to a power source such as a line voltage source. This power connection can be via a power cord and plug that interfaces with an electrical outlet or may be hardwired into an electrical circuit or circuit breaker. In some instances, power connection 704 to an AC power source can be used to repeatedly charge a rechargeable battery 706, such that battery 706 can later be used as a power supply if needed in the event of a loss of sufficient AC power. The power connection 704 may include circuitry (e.g. an AC-DC converter) to convert the input power to be compatible with the internal components of controller 700 and/or heating system 106 and/or external sensors 740. The power connection 704 may also include safety components such as Ground Fault Circuit Interrupt (GFCI), Ground Fault Equipment Protection (GFEP), fuses, or circuit breakers.

Communication Interface—A communication interface 708 in controller 700 can include components that enable controller 700 to communicate with a one or multiple local or remote devices, such as another master or slave controller, a communication hub, an external human-machine interface, a computer, a server, or any other compatible device. Communication interface 708 can allow communication via, e.g., Wi-Fi, wired Ethernet, 3G/4G wireless or other wireless standard, Bluetooth, HomePlug or other powerline communications method, radio frequency, telephone, or fiber optic by way of non-limiting examples. Communication interface 708 can include a wireless chip or card, physical plug, or some other transceiver connection. Communication interface 708 may communicate (e.g. send data, receive data, receive firmware updates, etc.) with a cloud application as described herein.

Sensors—By way of non-limiting example, one or more internal sensors 710 or external sensors 740 in communication with a controller 700 may be able to, e.g., detect acceleration, temperature, voltage, current, electrical power, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 710 and external sensors 740 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). A controller 700 may include a single sensor or multiple sensors and may be connected to or in communication with a single sensor or multiple sensors. In general, controller 700 may include one or more primary sensors and may also include one or more secondary sensors. The primary sensor(s) can sense data central to the core operation of the device (e.g., sensing temperature of the heating system 106 or power output of the heating system 106). The secondary sensor(s) can sense other types of data (e.g., precipitation, wind, light, or sound), which can be used to improve control algorithms and provide the control network with additional information. In some instances, an average user may even be unaware of an existence of a secondary sensor.

Sensor Interface—A sensor interface 712 in controller 700 can include components that enable controller 700 to communicate with one or multiple external sensors 740 of any type described above. Sensor interface 712 may contain different components and/or circuitry as well as different connection or plug types depending on the type of external sensor(s) 740.

Heater Interface—A heater interface 714 can include components that switch or modulate power to one or more heaters heating circuits 310. A heater interface 714 may consist of one or more relays, e.g. a solid-state relay (SSR), and one or multiple components or circuits required to drive the relay(s), such as Darlington transistors, discrete transistors, or switches, by way of non-limiting examples. A heater interface 714 may include one or more plugs, terminals, terminal blocks, connectors, or other means of electrically connecting to the heating system 106. In general, a heater interface will contain one switching circuit (e.g. a relay, a relay driver, and a circuit breaker) for each connected heating circuit 310 such that each heating circuit 310 may be individually controlled.

Control Circuitry—Control circuitry 716 of controller 700 can contain components for directing operation of the heating system 106 and processing signals from and communicating with the human-machine interface 702, heater interface 714, sensor interface 712 and sensors 710, and other communication interfaces 708. Control circuitry 716 may include, for instance, a processor and a computer-readable medium (CRM). The processor may include any processor type capable of executing program instructions in order to perform the functions and algorithms described herein. For example, the processor may be any general-purpose processor, specialized processing unit, or device containing processing elements. In some cases, multiple processing units may be connected and utilized in combination to perform the various functions of the processor. An example CRM may be any available media that can be accessed by the processor of control circuitry 716 and any other computing, processing, or communication elements in controller 710 or a network of controllers described herein. By way of example, the CRM may include RAM, ROM, EPROM, EEPROM, CD-ROM or other optical disk storage, magnetic disk storage or other magnetic storage devices, or any other medium that can be used to carry or store desired program code in the form of program instructions or data structures, and which can be executed by the processor. When information is transferred or provided over a network or another communications connection (either hardwired, wireless, or a combination of hardwired or wireless) to a machine, the machine properly views the connection as a CRM. Thus, any such connection to a computing device or processor is properly termed a CRM. Combinations of the above are also included within the scope of computer-readable media. Program instructions stored on the CRM may include, for example, instructions and data capable of causing a processing unit, a general-purpose computer, a special-purpose computer, special-purpose processing machines, or server systems to perform a certain function or group of functions. In other cases, one or multiple dedicated integrated circuits or special-purpose processors may process input command signals and output result signals that each element receives/transmits as part of the functions described herein. The control circuitry 716 can furthermore be implemented as localized versions or counterparts of algorithms carried out or governed remotely by servers or cloud-based systems.

By way of example, control circuitry 716 may be configured to process weather data from a cloud server or weather API (e.g. wunderground.com or darksky.net) to determine when to activate and deactivate the heating system 106. As another example, the control circuitry 716 may be configured to transmit raw or processed local sensor readings from sensors 710 and/or external sensors 740 to a cloud server, where these readings can be stored, analyzed, and used to send control signals back to controller 700, causing it to activate or deactivate the heating circuits 310 (through the heater interface 714) based on a cloud-based algorithm.

Modularity—All or some of the components and subsystems of controller 700 may be constructed such that they are modular and/or replaceable. Thus, individual components may be upgraded, and/or additional functionality may be added to controller 700 without replacing the entire unit.

Secondary Controller Configuration

One or more secondary controllers 720 may be connected to the controller 700 to operate different portions of the heating system 106. The secondary controller may contain a heater interface 722, a communication interface 724, a sensor interface 726, control circuitry 728, and any other components 730 of controller 700 that are not expressly described in FIG. 7. The controller 700, described above, and secondary controller 720 may be connected via the communication interface 708 of controller 700 and the communication interface 724 of secondary controller 720. Information and control signals may be passed bidirectionally between the two controllers using an appropriate communication protocol (BACnet, Modbus, LonWorks, Serial, etc.) and a communication layer suited to communication between the two controllers (Serial, Ethernet, ZigBee, WiFi, USB, RS-232, TTL, etc.). The controller 700 may act as the primary or master controller while the secondary controller 720 may act as the secondary or slave controller. Multiple secondary controllers may be connected to a single primary controller 700 to facilitate the control of large, distributed systems.

The primary controller 700 may be responsible for high level functionality such as data analysis, control, system sectioning, scheduling/timing/synchronization, and/or communications with a backend platform, by way of non-limiting example, while one or more secondary controllers 720 may be responsible for lower level functions such as sensor I/O, data processing (parsing, batching, low-level calculations, in-hardware calculations, etc.), and/or error detection, by way of non-limiting example. For example, if the control system of FIG. 7 is designed to collect voltage and current data from heating circuit 310 in the heating system 106, the secondary controller 720 may be responsible for reading in raw voltages from various sensors (e.g. current transformers, voltage transducers, etc.) and performing high frequency calculations to obtain useful data (RMS voltage/current, average voltage/current, phase, frequency analysis, etc.) from these raw values. This processed data may be of significantly smaller size than the raw data, such that less information must be transferred to the primary controller 700. Additionally, these calculations may be performed on specialized hardware in control circuitry 728, both improving processing time and freeing up processor time in the primary controller 700.

If controller 700 is used exclusively for high level processes, the heater interface 714 of controller 700 may not be connected directly to heating circuits 310 and/or the sensor interface may not be connected directly to external sensors 740. Instead the heating circuits 310 and/or sensors 740 will be connected to heater interface 722 and sensor interface 726 respectively.

A secondary controller 720 may contain some or all the components and functionality of a primary controller 700 depending on the overall system requirements. A secondary controller 720 in the control system of FIG. 7 may only perform data collection and processing. The control circuitry 728 may perform initial calculations on the sensed data, then transmit the processed data to controller 700 via the communication interface 724. Similarly, a secondary controller 720 in the control system of FIG. 7 may only perform heater switching functions. In such a configuration, the secondary controller 720 does not communicate directly with the external sensors 740 and therefore may not contain a sensor interface 726.

Such a distributed system containing primary and secondary control modules with specialized functionality may allow large systems to be controlled more effectively and efficiently at lower cost. Additionally, placing the heater interface 714 closer to heating circuits 310 may reduce the length of high voltage wiring and conduit, thereby reducing system cost. Similarly, placing sensor interface 726 closer to external sensors 740 may reduce the length of low voltage wiring and conduit, thereby reducing cost and electrical noise.

The control system of FIG. 7 may use a supervisory control and data acquisition (SCADA) model or a distributed control system (DCS) model as a basis for system architecture.

Operation

The heating system 106 may be operated by a control system containing one or more controllers 700 connected to one or more secondary controllers 720. For example, a controller 700 may serve as the master controller (power distribution, high level data analysis/algorithms, activation decisions, etc.) for the entire heating system 106 while several secondary controllers 720 each operate one or more heating circuits 310 within the heating system 106. A controller 700 may send signals to each secondary controller 720 to activate/deactivate (via the heater interface 722) each heating circuit 310.

A controller 700 may limit the total number of heating circuits 310 that are on at one time to ensure that the system does not draw more than some maximum allowed instantaneous power (power cap). Additionally, a controller 700 may limit the power output (through, e.g. voltage modulation) to a number of heating circuits 310 in order to keep total instantaneous power consumption under some maximum limit. Such power modulation can also be used to more efficiently run heating circuits 310 in anti-icing or de-icing modes described herein.

If a cable stayed bridge contains additional heating systems in the pylon(s) 102 and/or bridge deck 104, and these systems are controlled by the same control system as the cable stay heating system 106, the master controller 700 may additionally account for and control the power output to these systems.

Anti-Icing and De-Icing

Heating circuits 310 may be operated in anti-icing mode, where the heating circuits 310 are controlled such that the surface of cable sheath 200 remains free of snow/ice during a storm. This is generally accomplished by controlling heater temperature and/or heater power such that the surface temperature remains above freezing. This may involve a model that relates surface temperature to heater temperature/power using based on ambient conditions and the physical attributes of the specific embodiment of a cable sheath 200.

A controller may seek to optimize heater temperature/power of a heating circuit 310 for a set of ambient conditions by minimizing heat loss (i.e. to convection) while melting all incident snow/ice. This 'optimal' temperature/power is a function of the heat loss conditions (e.g. temperature, wind speed and direction, storm intensity, etc.) at the outer surface of the cable sheath 200. The 'optimal' output value may be constant (for a set of ambient conditions) or constantly updated using sensed values and/or feedback. Optimizing output can increase efficiency of the heating system 106.

Alternatively, heater circuits 310 may be operated in intermittent de-icing mode, where heating circuits 310 are powered/depowered on an intermittent basis during a storm. Snow/ice that accretes while a heating circuit 310 is off is melted when the heating circuit is turned on. The length of the heating period may be constant or based on ambient conditions. Additionally, snow sensing techniques may be used to determine when to deactivate a heating circuit 310, as described herein. The length of the off/unpowered period can be set such that total accumulation remains below a certain dangerous level.

In general, more energy is used in anti-icing mode than de-icing mode due to a difference in convective heat loss between each mode. During anti-icing, the surface of a cable sheath 200 may remain above ambient temperature for the duration of a storm, resulting in relatively constant convective losses. In de-icing mode, the surface temperature is only brought above ambient temperature for short activation periods, resulting is less total energy loss to convection. A combination of anti-icing and de-icing approaches may be used to reduce the total amount of energy used by a heating system 106 while maintaining an acceptable level of risk reduction.

Segmentation+Risk Reduction

The heating circuits 310 of a cable stay 100 may be arranged in segments, as described herein, such that segments at different elevations may be controlled separately. For example, if a storm is more intense (i.e. higher winds, accretion, etc.) at higher elevations, the heating system 106 may deliver more heating power to the upper heating circuits 310 of a cable stay 100 while delivering less heating power to those heating circuits 310 at lower elevations.

The system can also be programmed to prioritize snow mitigation of the highest risk heating circuits 310 of a cable stay 100. High risk sections are typically the areas with the most dangerous snow and ice accumulations (high density, large size) and the highest likelihood of falling onto the bridge deck 104 with high inertia.

For example, if the uppermost heating circuits 310 of a cable stay 100 are calculated to be the highest risk, then the top segments may be set to anti-icing mode while lower segments (i.e. lower risk) may be set to de-icing mode, and de-iced when power is available. If a risk factor is calculated for each segment and an electrical load cap for the system is established, then a control system can determine the optimal mix of anti-icing and de-icing to achieve the maximum level of risk reduction while keeping total power output under the maximum instantaneous power limit.

Circumferential Sectioning

The heating circuits 310 of a cable stay 100 may be arranged in around the circumference of the sheath, as discussed herein. Different heating circuits 310 may be controlled independently.

Under most environmental conditions, heat loss to convection and snow/ice accretion varies around the circumference of a cable stay 100. For example, more precipitation may strike the top side of a cable stay 100 than one or both side(s). By delivering more heat to the top side than, say, the left side, the heating system 106 may melt the incident snow more efficiently than a system where individual segments or sections cannot be controlled independently. In some cases where little to no accretion occurs on a section/segment of cable stay 100, the controller 700 may turn off or greatly reduce power those sections/segments while operating other sections/segments in anti-icing or de-icing mode, as needed. If meltwater refreezes on these unheated segments/sections, the controller 700 may heating circuits 310 in these sections/segments at some interval to melt the re-frozen meltwater.

Sensing

When one or more heating circuits 310 are operating in anti-icing mode, they can be used to determine the intensity of the storm. The storm intensity can then be used to determine the operating mode of each heating circuit 310. Storm intensity data calculated for a set of heating circuits 310 may be used to control other heating circuits 310 in other areas or on other similar cable stays 100. Storm intensity is determined by calculating the average power draw of a heater 206 or heating circuit 310 over a period of time. Higher power draw indicates a more intense storm while the differential between the power draw for different sections provides insight into the direction to the wind and the direction of the impacting precipitation. Information on ambient weather conditions (from local sensors or network/internet sources) and information from past storms can be combined with information on storm intensity to determine the best operational mode for each heating circuit 310.

A heating circuit 310 may be associated with a current sensor and a voltage sensor such that average temperature in the heating circuit 310 may be calculated from power data. Average temperature may be used to sense the presence and release of snow/ice by comparing temperature response to a known baseline response. Furthermore, sensors 740 may be placed on one or more cable stays 100, on a pylon 102 or the bridge deck 104. Sensors may be used to determine temperature response, weather conditions, power consumption, etc. Sensor data collected in one area of the bridge may be used to model response in other areas.

As noted above, systems, techniques, and physical embodiments described herein may be applied to components or structures other than cable stay bridges. For example, a heated cable sheath 200 may represent an external beam or support of a building/skyscraper. As another example, a heated cable sheath 200 may be the main cable or vertical cables of a suspension bridge.

FIG. 8—Example Cable Heater Sections Arranged Radially

Figure 8A:
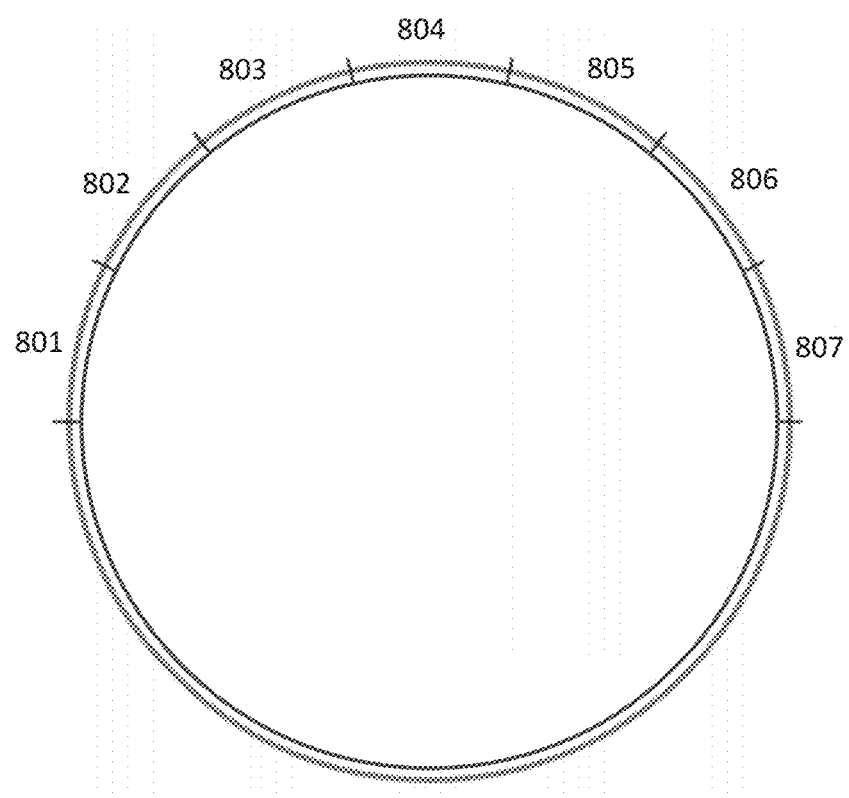
FIG. 8A illustrates an example cross-section of a cable with heater sections arranged radially about a top half of a circumference of the cable.

FIG. 8A illustrates an example cross-section of a cable with heater sections 801, 802, 803, 804, 805, 806 and 807, arranged radially about a top half of a circumference of the cable. Looking longitudinally at the cross-section of the cable, section 801 begins at 9 o'clock, section 804 is located at 12 o'clock, and section 807 ends at 3 o'clock. In this embodiment, one or more radial sections may be included about a bottom half of the circumference of the cable. Alternatively, seven additional radial sections may be provided about the bottom half of the circumference of the cable, symmetrically arranged relative to sections 801 through 807.

Figure 8B:
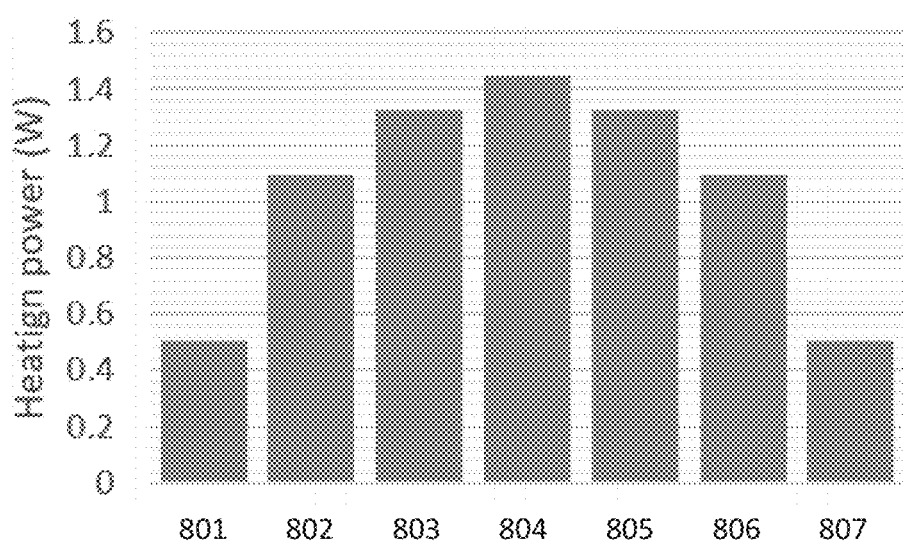
FIG. 8B illustrates a column graph showing exemplary power output necessary to maintain each radial section of FIG. 8A in an anti-icing mode.

FIG. 8B illustrates a column graph showing exemplary power output necessary to maintain each radial section of FIG. 8A in an anti-icing mode. In an exemplary test cable, radial sections 801 through 807 were operated to keep the test cable free of snow and ice by maintaining a cable outer surface temperature above 0° C., such that all precipitation melted on impact. The test cable was 1 m in length, with a diameter of 250 mm (frozen precipitation was falling directly downwards).

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A system for bridge cable ice mitigation, the system comprising:
 a plurality of heaters arranged in radial sections about a circumference of, and extending parallel to a longitudinal axis of, one or more bridge cables, the heaters configured to heat an outer surface of the bridge cables; and
 a control system including one or more controllers configured to individually activate and regulate heating output of the radial sections to mitigate cable ice, whereby snow or ice is prevented from falling from the bridge cables.

2. The system of claim 1, where the heaters are further arranged in axial sections, the axial sections arranged longitudinally, end to end along a length of the bridge cables, extending parallel to the longitudinal axis of the bridge cables, wherein the one or more controllers are configured to activate and regulate heating output of the axial sections individually, whereby different elevations of a bridge cable span, relative to ground, can receive a different heat output.

3. The system of claim 1, where each radial section comprises multiple wire heating elements that generally extend parallel to the longitudinal axis of the bridge cables, whereby the wire heating elements may be secured on a substrate to maintain spacing therebetween.

4. The system of claim 1, where the heaters are applied to an outside of an existing cable sheath of an existing bridge cable.

5. The system of claim 4, where the heaters are covered by a wrapped layer, whereby the wrapped layer protects the heaters, or holds the heaters in place, the wrapped layer thereby comprising the outer surface of the bridge cables.

6. The system of claim 1, where the heaters are embedded in an outer shell of a cable sheath assembly.

7. A system that controls bridge cable de-icing, comprising:
a plurality of heaters on one or more bridge cables, extending parallel to a longitudinal axis thereof, arranged in a plurality of heater sections, and configured to heat an outer surface of the bridge cables; and
a control system including one or more controllers configured to use precipitation event information directed to event intensity and event direction to algorithmically and individually direct power to the heater sections to limit total system heating power output, whereby the total system heating power output can be maintained below a predetermined total power capacity limit or can be operated at an algorithmically determined power output level factoring event intensity and a predetermined efficiency factor.

8. The system of claim 7, where the one or more controllers are configured to further direct power to the individual heater sections based upon de-icing requirements of each section.

9. The system of claim 7, where the plurality of heater sections are arranged radially about a circumference of the bridge cables, whereby the power individually directed to the heater sections can vary radially to account for differing heating requirements on different radial aspects of the bridge cables.

10. The system of claim 9, where the plurality of heater sections are further arranged axially, end to end along a length of the bridge cables, whereby the power individually directed to the heater sections can vary axially to account for differing heating requirements at different axial aspects of the bridge cables.

11. The system of claim 7, where the plurality of heater sections are arranged axially, end to end along a length of the bridge cables, whereby the power individually directed to the heater sections can vary axially to account for differing heating requirements at different axial aspects of the bridge cables.

12. The system of claim 7, where the one or more controllers are configured to additionally use weather data to calculate event intensity and event direction, to individually adjust power directed to each heater section, and to determine a sectioning order that increases heating power to specific heater sections in areas expected to experience increased accumulation and that decreases heating power to specific heater sections in areas not expected to experience accumulation.

13. The system of claim 7, where the one or more controllers are configured to monitor and used power output and temperature of individual heater sections to determine heat loss, caused by the precipitation event, at respective individual heater sections, whereby the one or more controllers are configured to individually adjust power directed to each heater section according to the event intensity and the event direction.

14. The system of claim 13, where the one or more controllers are configured to:
use heating response information of an individual heater section to determine whether frozen precipitation is impacting, or has accumulated on, the individual heater section; and
use the heating response information from one area or bridge cable to inform a control of another area or bridge cable.

15. The system of claim 7, where the one or more controllers are configured to activate individual heater sections in an order determined to prioritize a reduction of risk of falling frozen precipitation, in areas characterized as higher risk, from bridge cable sections associated with the individual heater sections.

16. The system of claim 7, where the one or more controllers are configured to direct power to an individual heater section after a certain amount of frozen precipitation has accumulated on a bridge cable section associated with the individual heater section, such that the certain amount of frozen precipitation is removed, wherein the one or more controllers are configured to direct power to the individual heater section to induce accumulation release at an interval determined, by the one or more controllers, to keep frozen accumulation, at the respective location, below a preselected level.

17. The system of claim 7, where the one or more controllers are configured to direct power to an individual heater section to maintain a surface temperature of an associated bridge cable section, at the individual heater section location, at or above a level sufficient to melt any incoming frozen precipitation such that no frozen accumulation occurs on the associated bridge cable section.

18. A system that limits instances of falling snow and ice from a bridge cable, the system comprising:
a plurality of heaters on one or more bridge cables, extending parallel to a longitudinal axis thereof, arranged in a plurality of heater sections, and configured to heat an outer surface of the bridge cables; and
a control system including one or more controllers configured to use precipitation event information to algorithmically determine a prioritization schedule to individually direct power to the heater sections, where:
a portion of the heater sections operate in an anti-icing mode, where a surface temperature of an associated bridge cable section, at the individual heater section location, is held at or above a level sufficient to melt any incoming frozen precipitation such that no frozen accumulation occurs on the associated bridge cable section; and
a portion of the individual heater sections operate in a de-icing mode, where a bridge cable section is heated after a certain amount of frozen precipitation has accumulated on the bridge cable section, such that a melt layer is formed and the certain amount of frozen precipitation releases from the bridge cable section, and where an interval is determined, for intermittent heating in the de-icing mode, to induce accumulation release before frozen accumulation reaches a preselected level;
whereby the one or more controllers are configured to prevent dangerous accumulations of frozen precipitation while operating under a preselected total power constraint such that power is individually directed to the heater sections to prioritize a reduction of risk of falling frozen precipitation, in areas characterized as higher risk, by addressing each bridge cable section associated with each heater section.

19. The system of claim 18, where the one or more controllers, configured to determine a prioritization schedule to individually direct power to the heater sections, includes a determination that a portion of the individual heater sections do not operate.

20. The system of claim 18, where the plurality of heater sections are arranged radially about a circumference of the bridge cables, whereby the power individually directed to the heater sections can vary radially to account for differing heating requirements on different radial aspects of the bridge cables.

* * * * *